US008135358B1

(12) United States Patent
Hesse et al.

(10) Patent No.: US 8,135,358 B1
(45) Date of Patent: Mar. 13, 2012

(54) DEVICE, METHOD, AND SYSTEM FOR EXTENDED FREQUENCY BAND COMMUNICATION

(75) Inventors: Robert T. Hesse, Dayton, MD (US); Benjamin Stern, Germantown, MD (US); Glen Parker, Washington, DC (US); Mitchell H. Herbets, Potomac, MD (US)

(73) Assignee: Thales Communications Inc., Clarksburg, MD (US)

( * ) Notice: Subject to any disclaimer, the term of this patent is extended or adjusted under 35 U.S.C. 154(b) by 427 days.

(21) Appl. No.: 12/395,146

(22) Filed: Feb. 27, 2009

Related U.S. Application Data

(60) Provisional application No. 61/031,826, filed on Feb. 27, 2008.

(51) Int. Cl.
*H04B 1/38* (2006.01)
(52) U.S. Cl. ............... 455/90.3; 455/90.2; 455/100
(58) Field of Classification Search .................. None
See application file for complete search history.

(56) References Cited

U.S. PATENT DOCUMENTS

| 6,041,243 | A  | * | 3/2000 | Davidson et al. | 455/575.1 |
| 7,733,658 | B1 | * | 6/2010 | Perkins et al.  | 361/752   |
| 2006/0183492 | A1 | * | 8/2006 | Davies       | 455/518   |

* cited by examiner

*Primary Examiner* — Anh Tran
(74) *Attorney, Agent, or Firm* — Arent Fox LLP

(57) ABSTRACT

A communication device may include a manpack, and a radio removably attached to the manpack, the radio serving as a communications element of the manpack.

25 Claims, 9 Drawing Sheets

DEVICE, METHOD, AND SYSTEM FOR EXTENDED FREQUENCY BAND COMMUNICATION

CLAIM OF PRIORITY UNDER 35 U.S.C. §119

This application claims the benefit of and priority to U.S. Provisional Patent Application No. 61/031,826, titled "Device, Method, and System for Extended Frequency Band Communication," filed Feb. 27, 2008, the disclosure of which is hereby incorporated by reference herein.

BACKGROUND

Field

The present invention is directed to a device, method, and system for extended frequency band communication, and more particularly, to a communication device including a manpack having a removably attachable portable hand-held radio as a communications element.

INTRODUCTION

In the current state of the art, some users that require communication capability within the HF (1.6-30 MHz) and VHF/UHF (30-512 MHz) frequency bands, carry two man packs—one for communication within the HF band and another for communication within the VHF/UHF band. This practice may pose a significant burden on the user if, for example, each manpack is about 16 pounds and the user is required to carry the manpacks, as well as other equipment on an extended mission.

Typical manpacks may also have one main battery or a battery box that includes two batteries. Should the main battery or any of the batteries need to be replaced, the manpack needs to be powered down. This operation results in a temporary break in communications capability, which may be extremely undesirable in certain critical scenarios, such as during a military engagement.

There is a need in the art, therefore, for a portable radio device, method, and system that provide a durable, low-burden, uninterrupted communications capability in the HF and VHF/UHF frequency bands.

SUMMARY

According to an aspect of the disclosure, a communication device may include a manpack, and a radio removably attached to the manpack, the radio serving as a communications element of the manpack.

According to another aspect of the disclosure, a method may include receiving a signal via a manpack configured to provide communications capability in the High Frequency (HF) band, and routing the signal from the manpack to a radio removably attached to the manpack, the radio serving as a communications element of the rewritten paragraph.

It is understood that other aspects of the invention will become readily apparent to those skilled in the art from the following detailed description, wherein it is shown and described only various aspects of the invention by way of illustration. As will be realized, the invention is capable of other and different aspects and its several details are capable of modification in various other respects, all without departing from the scope of the invention. Accordingly, the drawings and detailed description are to be regarded as illustrative in nature and not as restrictive.

BRIEF DESCRIPTION OF THE DRAWINGS

These and other sample aspects of the disclosure will be described in the detailed description and the appended claims that follow, and in the accompanying drawings, wherein:

Figure 1:
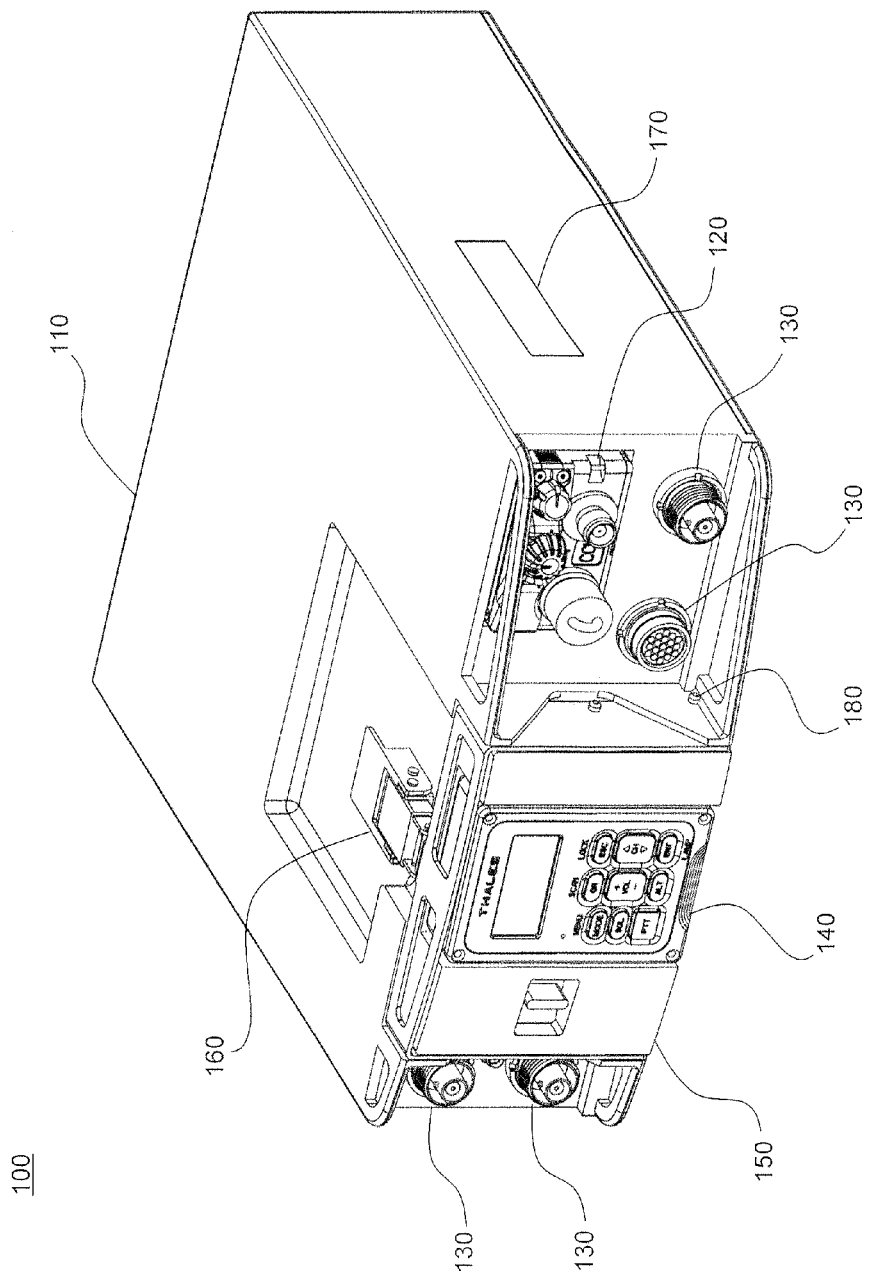
FIG. 1 illustrates an exemplary manpack, in accordance with an aspect of the present invention.

In accordance with common practice the various features illustrated in the drawings may be simplified for clarity. Thus, the drawings may not depict all of the components of a given apparatus or method. In addition, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. An aspect may comprise one or more elements of a claim.

Various aspects of the present invention solve the above-identified needs, as well as others, via a communication device including a manpack and a removably attachable portable hand-held radio as a core communications element, which is capable of providing a low-burden, uninterrupted communications capability in both the HF (1.6-30 MHz) and VHF/UHF (30-512 MHz) frequency bands.

FIG. 1 shows a communication device 100 in accordance with an aspect of the present invention. The device 100 may include a manpack 110 having a removably attachable handheld radio 120 that serves as a core communications element. The hand-held radio 120 may be a field proven hand-held radio, such as JEM, made by Thales Communications, Inc., of Clarksburg, Md. The hand-held radio 120 may be housed and latched by a latch 170 in a sleeve in the manpack 110. The latch 170 may be a flip-up latch, and can be located on the side of the manpack 110, the top, or any other surface of the manpack 110. The latch may also include a button or any other mechanism capable of releasing the hand-held radio 120 from the manpack. Because the latch 170 provides such a simple release mechanism, the hand-held radio 120 may be quickly removed and used separately without the manpack.

The hand-held radio 120, as a separate element from the manpack 110, may include the necessary components for receiving and transmitting an RF signal at approximately 5 watts over the VHF/UHF (e.g., 30-512 MHz) frequency band, as well as interfacing with the manpack 110. The manpack 110 may include a power amplifier for amplifying the 5 watt RF signal of the hand-held radio 120 to about 20 watts, a frequency converter for adding communications capability within the HF (e.g., 1.6-30 MHz) frequency band and converting the RF signal frequency into another frequency within the HF and VHF/UHF bands, and a main battery 190 for providing power to the manpack 110, as well as charging a battery of the hand-held radio 120. The manpack may also include one or more dedicated antenna connectors 130 for connecting various antennas (e.g., Broadcom, Satcom, HF), a removable control unit 140 for remotely operating the communication device 100, a battery door 150 for providing front-loaded flip-up or other type of access to the main battery 190 via latch 160, and other components for providing necessary communications capabilities and facilitating the use of the communication device 100.

The hand-held radio 120 and the manpack 110, when combined, constitute the communication device 100. As a whole, the communication device 100 may be able to transmit RF signals at about 20 watts over both the HF (e.g., 1.6-30 MHz) and VHF/UHF (e.g., 30-512 MHz) frequency bands.

For interfacing with the manpack 110, the hand-held radio 120 may include a side-connector (not shown) having a plurality of pins (e.g., 22 pins) and a planar RF connector. One of the pins may be a mode pin that, by sensing different resistance values, can detect whether the hand-held radio 120 is inside and connected to the manpack 110 or is detached from the manpack 110, and can set the mode (e.g., connected or disconnected) of the hand-held radio 120 accordingly.

During signal transmission, in accordance with some aspects of the present invention, when the hand-held radio 120 is inserted into and physically connected to the manpack 110, the resistance on the mode pin may cause the RF signal in the hand-held radio 120 to be routed to the planar RF connector, instead of an antenna that may be provided on or cabled to the hand-held radio 120. The RF signal may then propagate from the hand-held radio 120 to the manpack 110 via the planar RF connector. Inside the manpack 110, the RF signal may be transmitted via either the VHF/UHF path or the HF path, depending on which frequency band is being used for transmission. If the device 100 is set to transmit in the VHF/UHF band, the RF signal may first be transmitted directly to the VHF/UHF amplifier, where the RF signal is amplified (e.g., from 5 to 20 watts), and then transmitted to the antenna of the manpack 110, from which the signal may be transmitted (e.g., over the air) to a receiving device. If the device 100 is set to transmit in the HF band, the RF signal may first be transmitted to the frequency converter, where it is converted to a frequency within the HF band, then transmitted from the frequency converter to the HF amplifier, where it is amplified (e.g., from 5 to 20 watts), and then transmitted from the HF amplifier to the antenna of the manpack 110, where it may finally be transmitted (e.g., over the air) to the receiving device.

During signal reception, in accordance with some aspects of the present invention, the received signal comes in through the antenna of the manpack 110. The signal is transmitted from the antenna to a bypass switch that bypasses the signal around the power amplifier and routes the signal either directly to the hand-held radio, in the case of VHF/UHF communications, or to an up-down converter, in the case of HF communications. In the case of HF communications, the signal may be received anywhere between 1.6 MHz and 30 MHz, for example. Upon receipt, the received HF signal is mixed by the direct digital synthesizer and is up-converted so that the intermediate frequency (IF) of the received signal is maintained at an approximately constant value (e.g., 86.85 MHz) for transmission to the hand-held radio 120. The hand-held radio 120 may perform automatic gain control (AGC), automatic level control (ALC), demodulation, and cryptographic functions on the received signal.

To facilitate signal processing within the HF band, the hand-held radio 120 may be set to an approximately constant IF value (e.g., 86.85 MHz) and may provide the IF to the manpack 120 for operations within the HF band. The manpack 120 may use the IF to up-convert or down-convert the signal via the frequency converter as needed for transmission or reception in the HF band.

Figure 2:
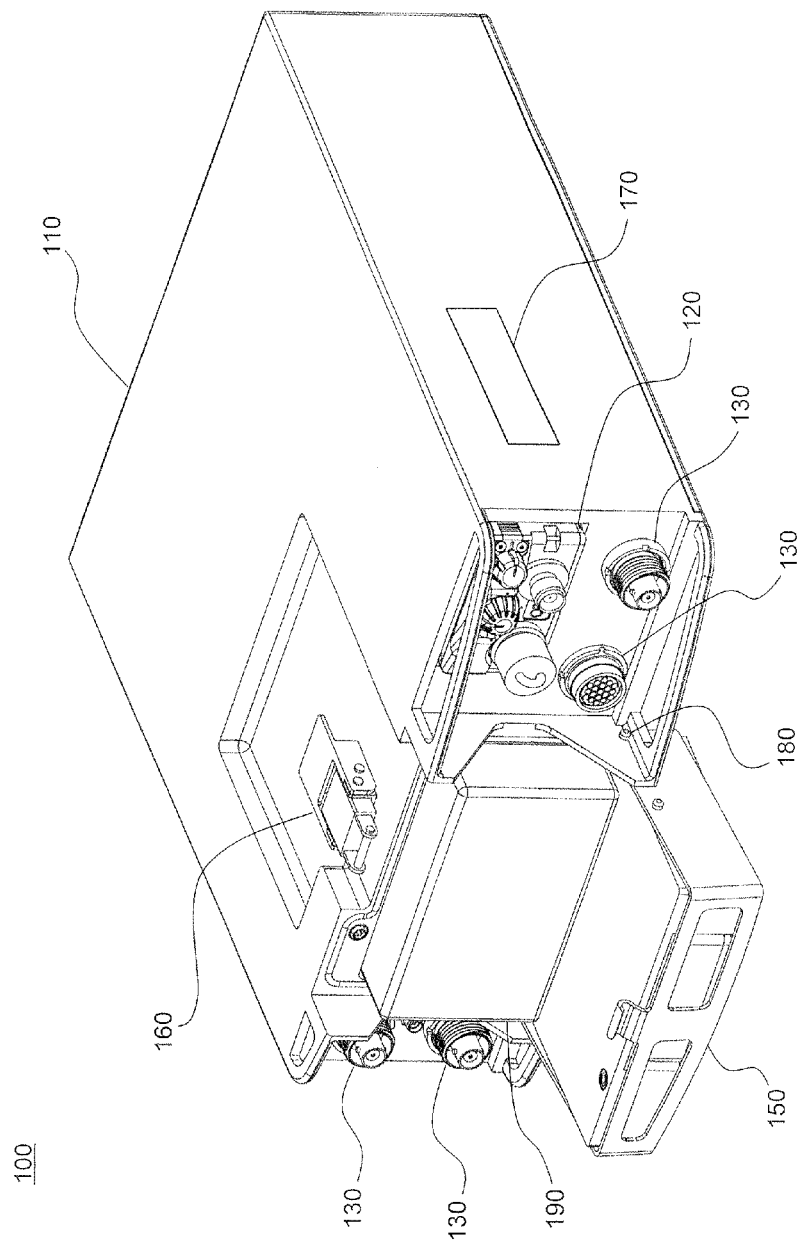
FIG. 2 illustrates an exemplary manpack with an open battery door, in accordance with an aspect of the present invention.

As shown in FIGS. 1 and 2, in an exemplary implementation in accordance with an aspect of the present invention, the battery door 150 may be provided on the front of the manpack 110 (e.g., side of manpack 110 including the hand-held radio 120, control unit 140, and antenna connectors 130) to facilitate access to the main battery 190. This arrangement provides an advantage, in that when the manpack 110 is in a rucksack, with the front of the manpack exposed to the elements, the user does not need to take out the whole manpack 110 to replace the battery 190, but can simply unlatch the battery door 150 and replace the battery 190 while maintaining the manpack 110 inside the rucksack.

As shown in FIG. 2, the battery door is designed to open in a flip-up manner and maintain a generally constant force around a gasket, regardless of small variations and tolerances when in a locked position. Rather than hinging at its edges, the battery door 150 may pivot about its middle over a hinge bar that is hinged at one edge and that can be caught by the latch 160. In particular, the battery door 150 may include two pivot axes, one of which is indicated by rivet head 180. At the first pivot axis, the battery door 150 is linked to the chassis of the manpack 110 via a balance link. At the top of the balance link are located hooks to which the latch 160 is able to latch. The middle of the balance link includes a second pivot axis, about which the battery door 150 pivots. This design can approximately double the force provided by the latch and ensure that, when the battery door 150 closes, the motion of the battery door 150 relative to the chassis is forward and away from the chassis, so that the battery door 150 and the chassis can tolerate a weight shift of approximately 20 to 50 pounds. Among other things, this design can provide for looser tolerances on the gasket, the battery door 150, and the chassis. Furthermore, such a design is not difficult to manufacture, and may thus be cost effective. It should also be appreciated that even though the latch 160 may be the only latch for latching the battery door 150, the structure and mechanism of the battery door 150 are such that the latch 160 is sufficient to latch the battery door 150 in a sturdy and balanced manner.

Furthermore, during the opening of the battery door 150, the battery 190 may be pushed or pulled out by some mechanism, such as at least one spring or other biasing mechanism and/or lever, or other mechanical or electrical component. During closing of the battery door 150, the battery 190 may be pulled or pushed back inside the manpack 110 via a similar or different mechanism.

The main battery 190 may be a standard issue battery. Should the battery 190 need to be replaced, the communication device 100 does not need to be powered down. The manpack 110 and the hand-held radio 120 may run on the battery of the hand-held radio 120 after the battery 190 is removed. Once the battery 190 is replaced, the manpack 110 may switch back to using the main battery 190, and the hand-held radio 120 may recharge its own battery using the new main battery 190. As such, the communication capabilities of device 100 are not disrupted when replacing the main battery 190 of the communication device 100.

In accordance with another example implemented in accordance with aspects of the present invention, the manpack 110 and/or the hand-held radio 120 may be outfitted with a vehicle mount in order to be easily mounted within a vehicle via, for example, some sort of holding mechanism (e.g., snap-fit, plunger action, screw on action, pressure-snap action, latch). This arrangement provides for quick attachment and removal of the manpack 110 and/or the hand-held radio 120 within a vehicle.

Figure 3:
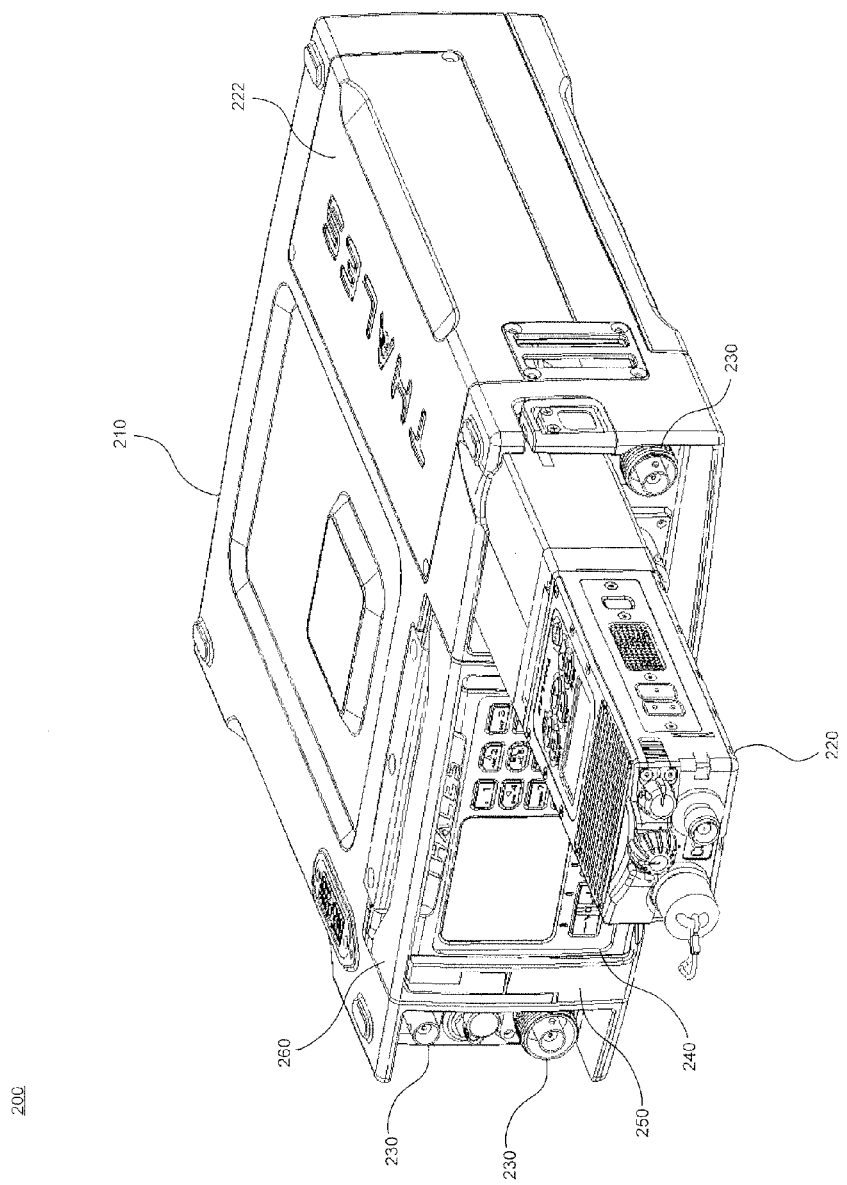
FIG. 3 illustrates an exemplary manpack with a partially inserted radio, in accordance with an aspect of the present invention.
Figure 4:
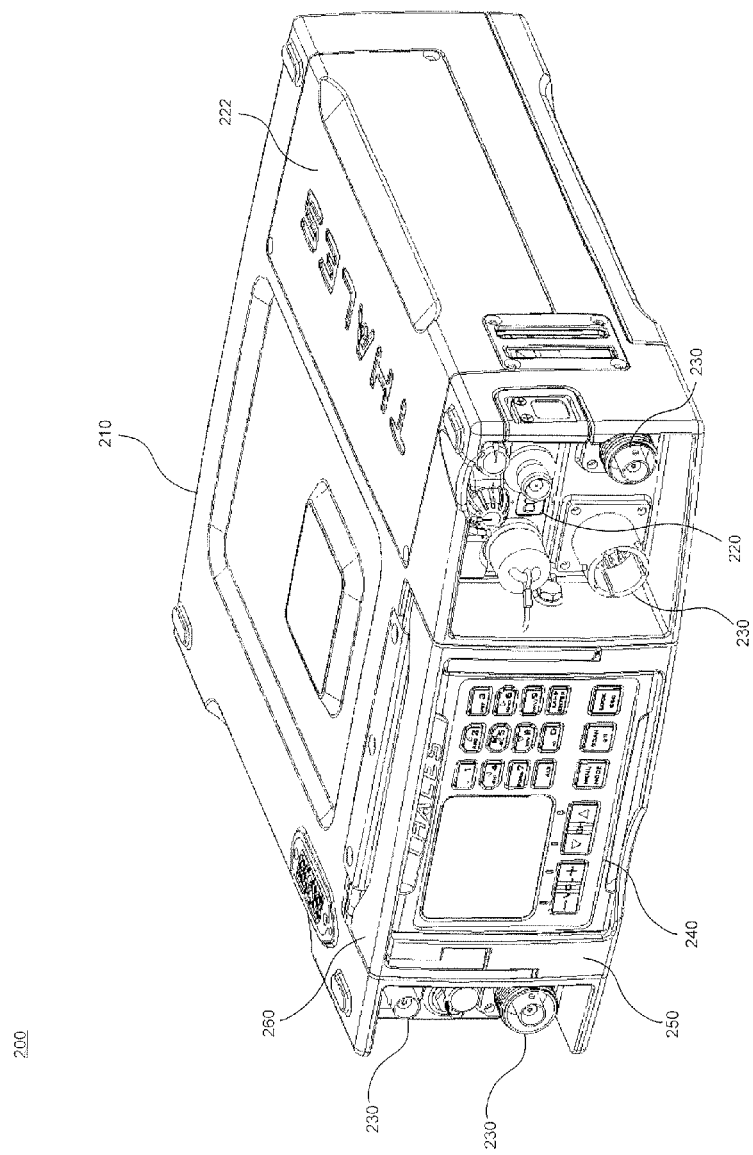
FIG. 4 illustrates an exemplary manpack with a fully inserted radio, in accordance with an aspect of the present invention.

FIGS. 3-7 show a communication device 200 in accordance with aspects of the present invention. The device 200 is similar to the device 100 shown in FIG. 1, as it may include a manpack 210 having a removably attachable hand-held radio 220 that serves as a core communications element. The manpack 210 and the radio 220 correspond to the manpack 110 and the radio 120, respectively, and may include at least the same principal communication capabilities as those described above with reference to FIGS. 1 and 2. Furthermore, antenna connectors 230 and control unit 240 may correspond to the connectors 130 and the control unit 140 of device 100, as shown in FIGS. 1 and 2. The main difference between the device 100 and the device 200 are the battery door mechanism, discussed with reference to FIGS. 6 and 7, and the inclusion of a radio clamping mechanism 270, discussed with reference to FIG. 5. FIG. 3 shows the device 200 where the radio 220 is partially inserted into the manpack 210, and FIG. 4 shows the device 200 where the radio 220 is fully inserted into the manpack 210, in accordance with aspects of the present invention.

Figure 5:
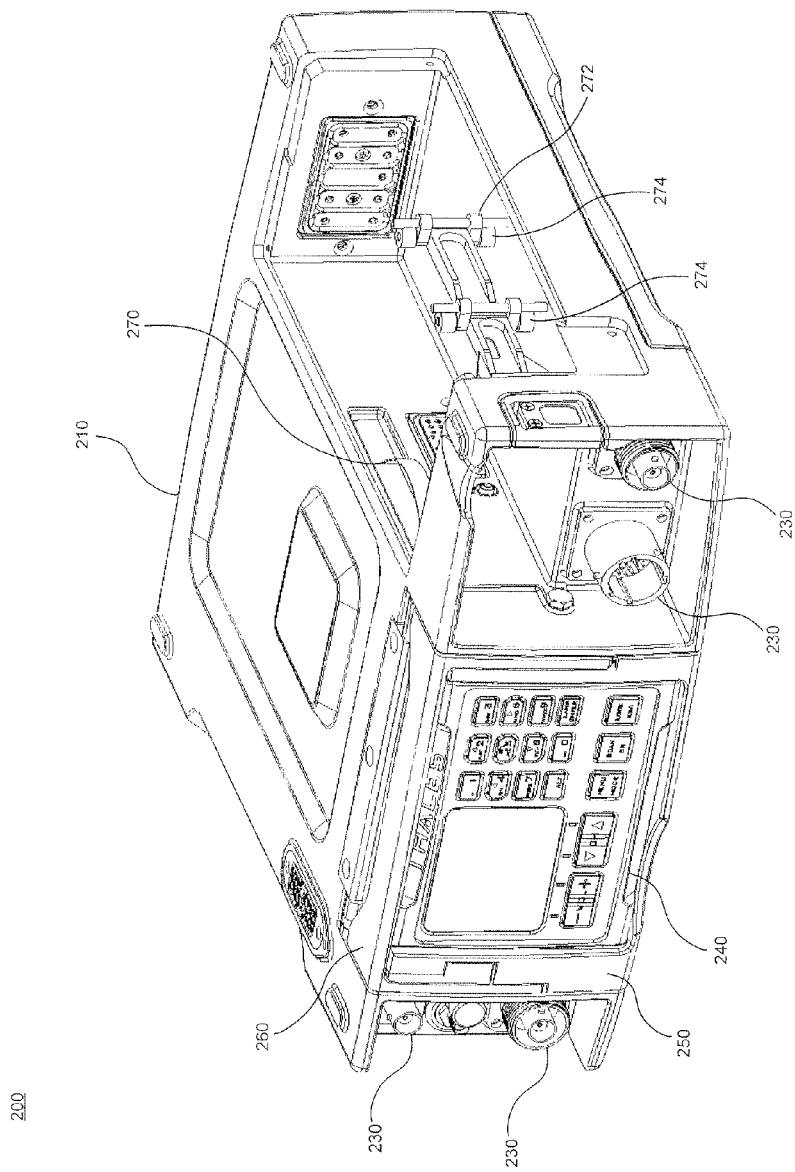
FIG. 5 illustrates an exemplary manpack with a removed radio cover, in accordance with an aspect of the present invention.

The device 200 may include a radio cover 222 that may be removed from the manpack 210 in order to expose the radio clamping mechanism 270. As shown in FIG. 5, the radio clamping mechanism 270 may include a parallel set of swing arms 272 with rollers 274. The swing arms 272 may move in an arc tangential to the surface of the radio, generating maximum clamping force at full engagement with the radio 220, when fully inserted. The radio housing that includes the clamping mechanism 270 may also include power and control connectors for the radio 220, such as a blind-mate coaxial connector that facilitates communication between the radio 220 and the manpack 210.

Figure 6:
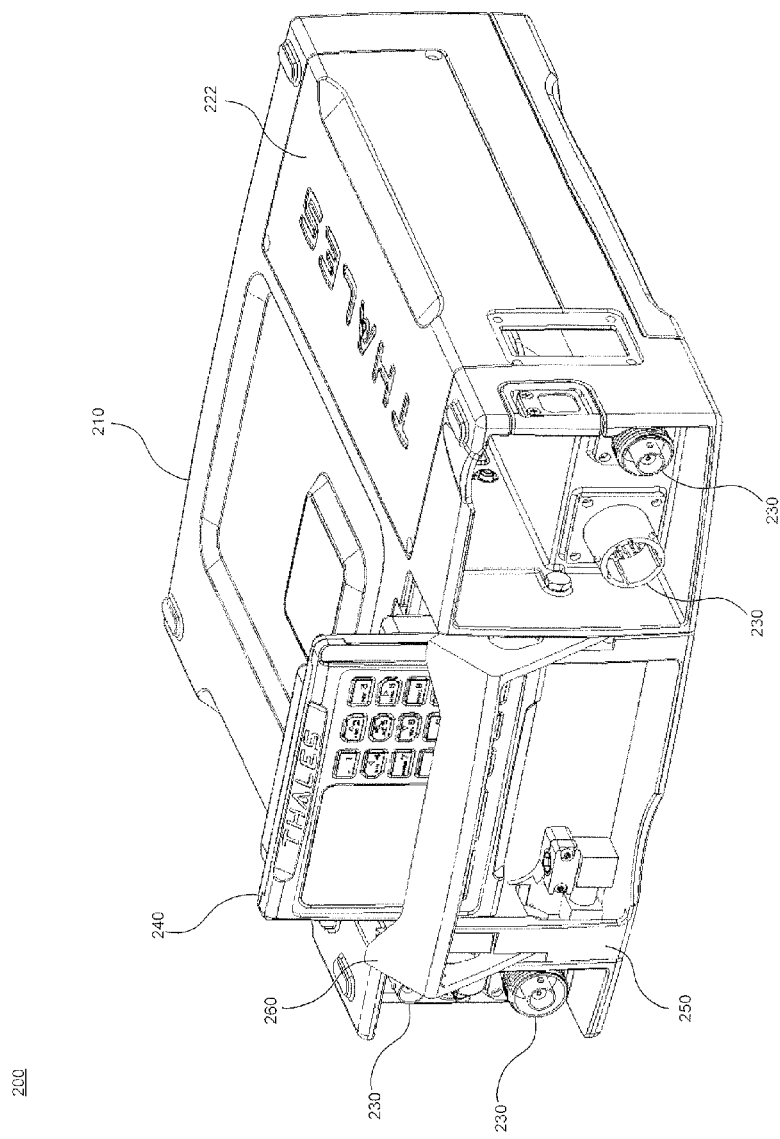
FIG. 6 illustrates an exemplary manpack with a battery door mechanism in a first release position, in accordance with an aspect of the present invention.

FIG. 6 shows the device 200 with the battery door mechanism in a first release position. As shown in FIG. 6, a battery door handle 260 may be pulled about a pivot point away from the manpack 210 in order to create an opening for removal of the control unit 240.

Figure 7:
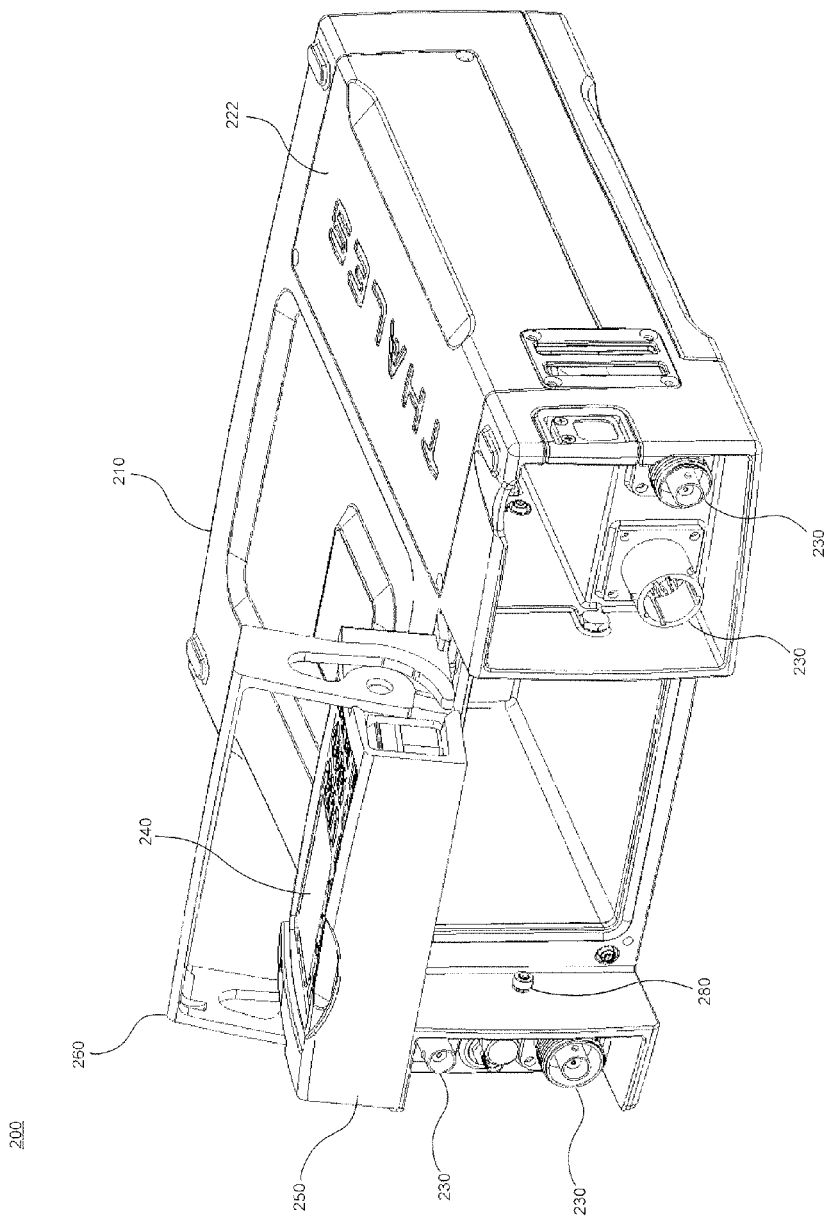
FIG. 7 illustrates an exemplary manpack with the battery door mechanism in a second release position, in accordance with an aspect of the present invention.

FIG. 7 shows the device 200 with the battery door mechanism in a second release position. As shown in FIG. 7, the battery door handle 260 may include curved surfaces that engage bushings 280 mounted on the chassis of the manpack 210 in order to close the battery door and apply force to the gasket. In the second release position, the battery door 250 is fully open, allowing access to the main battery and other components of the manpack 210.

Figure 8:
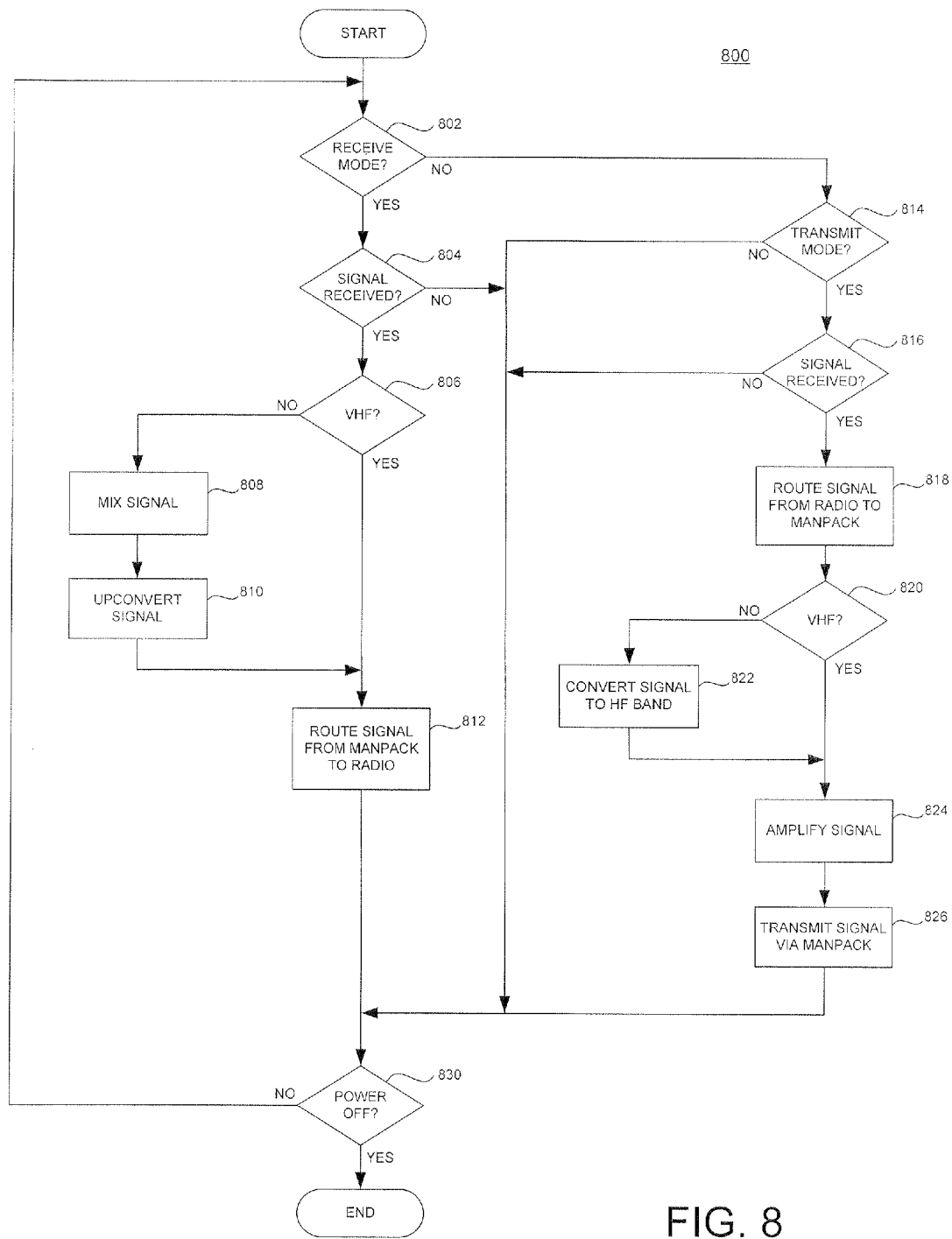
FIG. 8 is a flowchart depicting an example of transmit and receive functions of an exemplary manpack with radio, in accordance with aspects of the present invention.

An example of the operation of the transmit and receive functions of devices 100 and 200 of FIGS. 1-7 will now be described with respect to the flow chart illustrated in FIG. 8. As shown in FIG. 8, in block 802, a determination is made as to whether the device is in receive mode. If the device is in receive mode, the process proceeds to block 804, otherwise the process proceeds to block 814.

In block 814, the process determines whether the device is in transmit mode. If the device is in transmit mode, the process proceeds to block 816, otherwise the process proceeds to block 830. In block 816, a determination is made as to whether a signal is received from the user for transmission. The signal may be received via a microphone connected to the radio 120, for example. If a signal is received, then the process proceeds to block 818, otherwise the process proceeds to block 830. In block 818, the signal to be transmitted is routed to from the radio 120 to the manpack 110. The process then proceeds to block 820 where a determination is made as to whether the device is set to transmit within the VHF/UHF band. If the device is set to transmit within the VHF/UHF band, the process proceeds to block 824, otherwise the process proceeds to block 822. In block 822, the signal is converted to be transmitted within the HF band, and the process proceeds to block 824.

In block 824, the process amplifies the signal to be transmitted and proceeds to block 826. For example, if the device 100 is set to transmit within the VHF/UHF band, a VHF/UHF amplifier within the manpack 110 amplifies the signal; and if the device 100 is set to transmit within the HF band, an HF amplifier within the manpack 110 amplifies the signal. In block 826 the amplified signal is transmitted via an antenna of the manpack 110. After the signal is transmitted, the process then proceeds to block 830.

In block 804, a determination is made as to whether a signal is received in receive mode by, for example, the device 100. If a signal is received, the process proceeds to block 806, otherwise the process proceeds to block 830. In block 806, the process determines whether the received signal is within the VHF/UHF frequency band. If it is, then the process proceeds to block 812, if not, the process proceeds to block 808. In block 808 the received signal, which is within the HF frequency band, is mixed down to an intermediate frequency at block 808, and then up-converted at block 810 so that the intermediate frequency of the received signal is maintained at an approximately constant value for transmission from the manpack 110 to the radio 120, for example. The process then proceeds to block 812 where the received signal is routed from the manpack 110 to the radio 120. At the radio 120 the signal may be output, for example, via a speaker on the radio 120.

After block 812 the process proceeds to block 830. In block 830 a determination is made as to whether the device 100 is powered off. If the device 100 is not powered off, the process returns to block 802. Otherwise, the process ends.

Figure 9:
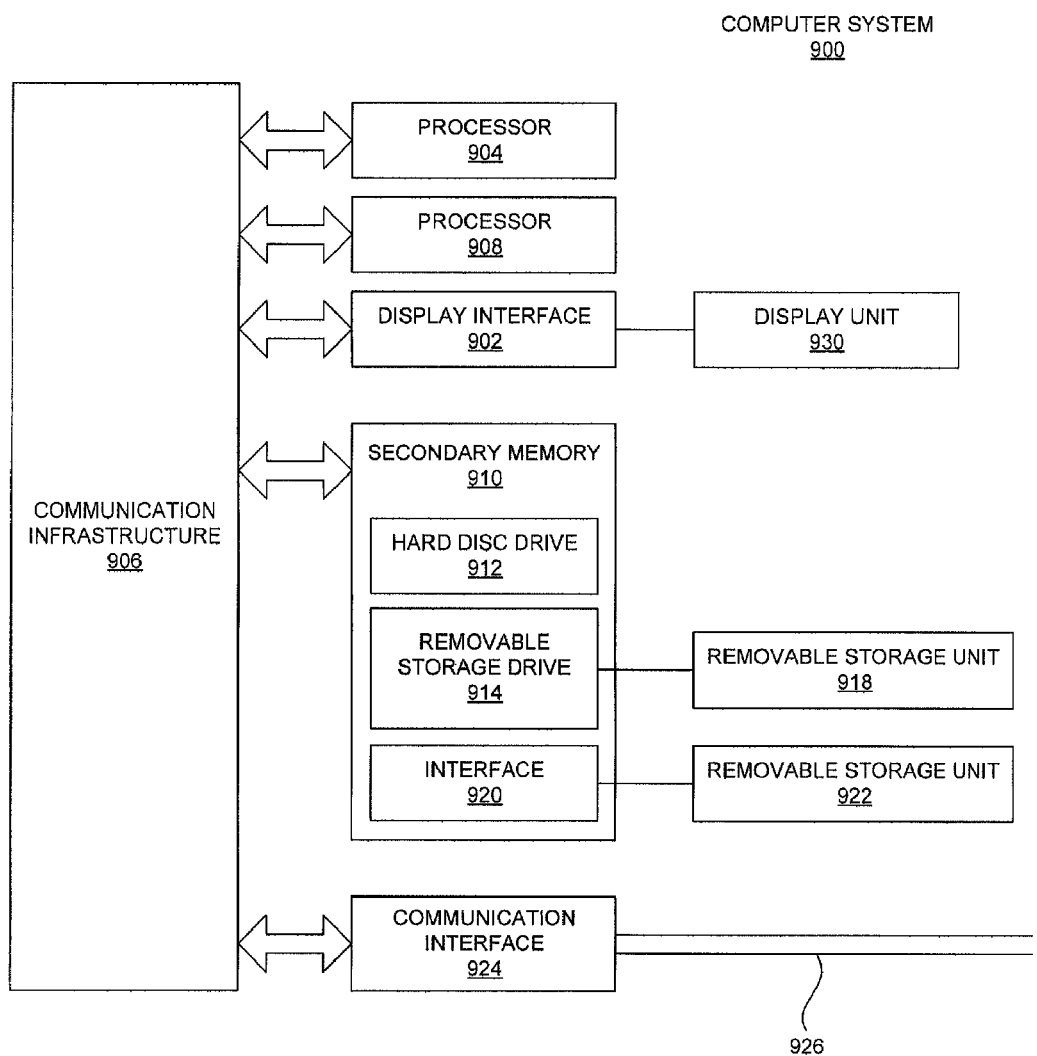
FIG. 9 presents an exemplary system diagram of various hardware components and other features, for use in accordance with aspects of the present invention.

Aspects of the present invention, as well as programming functions performed via a separate terminal, may be implemented using hardware, software, or a combination thereof and may be implemented in one or more computer systems or other processing systems. In one aspect, the invention is directed toward one or more computer systems capable of carrying out the functionality described herein. An example of such a computer system 900 is shown in FIG. 9.

Computer system 900 includes one or more processors, such as processor 904. The processor 904 is connected to a communication infrastructure 906 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative variations, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals, which may be electronic, electromagnetic, optical or other signals capable of being received by communications interface 924. These signals are provided to communications interface 924 via a communications path (e.g., channel) 926. This path 926 carries signals and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals. These computer program products provide software to the computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 910 to perform the features of the present invention. Accordingly, such computer programs represent controllers of the computer system 900.

In a variation where the invention is implemented using software, the software may be stored in a computer program product and loaded into computer system 900 using removable storage drive 914, hard drive 912, or communications interface 920. The control logic (software), when executed by the processor 904, causes the processor 904 to perform the functions of the invention as described herein. In another aspect, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another aspect, the invention is implemented using a combination of both hardware and software.

While the present invention has been described in connection with preferred aspects, it will be understood by those skilled in the art that variations and modifications of the preferred aspects described above may be made without departing from the scope of the invention. Other aspects will be apparent to those skilled in the art from a consideration of the specification or from a practice of the invention disclosed herein.

What is claimed is:

1. A communication device, comprising:
 a manpack configured to provide communications capability; and
 a radio removably attached to the manpack, the radio serving as a communications element of the manpack.

2. The communication device of claim 1, wherein the radio is a hand-held portable radio.

3. The communication device of claim 1, wherein the radio is configured to provide communications capability in the Very High Frequency (VHF) band and the Ultra High Frequency (UHF) band.

4. The communication device of claim 3, wherein the manpack is configured to provide communications capability in the High Frequency (HF) band.

5. The communication device of claim 4, wherein, when the device is in a receive mode and a received signal is in the VHF/UHF band, the manpack is configured to route the received signal directly to the radio.

6. The communication device of claim 4, wherein, when the device is in a receive mode and a received signal is in the HF band, the manpack is configured to convert the received signal and to route the converted signal to the radio.

7. The communication device of claim 6, wherein the manpack mixes down the received signal to an intermediate frequency of 86.85 MHz prior to routing the signal to the radio.

8. The communication device of claim 4, wherein, when the device is set to transmit in the VHF/UHF band, the manpack is configured to receive a signal in the VHF/UHF band from the radio, and to amplify the signal via a VHF/UHF amplifier for transmission over an antenna.

9. The communication device of claim 4, wherein, when the device is set to transmit in the HF band, the manpack is configured to receive a signal in the VHF/UHF band from the radio, to convert the signal to be transmitted within the HF band, and to amplify the signal via an HF amplifier for transmission over an antenna.

10. A communication device, comprising:
a manpack; and
a radio removably attached to the manpack, the radio serving as a communications element of the manpack; a
wherein the manpack comprises a main battery, and the radio comprises a secondary battery,
wherein the main battery is configured to power the manpack and to recharge the secondary battery, and
wherein the secondary battery is configured to power the manpack and the radio when the main battery is depleted or is disconnected from the manpack.

11. A communication device, comprising:
a manpack; and
a radio removably attached to the manpack, the radio serving as a communications element of the manpack;
wherein the manpack comprises a battery door configured to secure a main battery within the manpack, the battery door being further configured to open in a flip-up manner, and, when closed, to maintain a generally constant force around a gasket of the manpack.

12. A communication device, comprising:
a manpack; and
a radio removably attached to the manpack, the radio serving as a communications element of the manpack;
wherein the manpack comprises a battery door having a mechanism configured to secure a main battery within a chassis of the manpack and to secure a control unit within the battery door.

13. The communication device of claim 12, wherein the battery door mechanism in a first position is configured to release the control unit while securing the main battery.

14. The communication device of claim 13, wherein the battery door mechanism in a second position is configured to unlock the control unit and unlock the main battery.

15. The communication device of claim 14, wherein the mechanism comprises a handle having a plurality of curved surfaces configured to engage bushings mounted on the chassis of the manpack.

16. A method, comprising:
receiving a signal via a manpack configured to provide communications capability;
routing the signal from the manpack to a radio removably attached to the manpack, the radio serving as a communications element of the manpack.

17. The method of claim 16, wherein the manpack is configured to provide communications capability in the High Frequency (HF) band.

18. The method of claim 16, wherein the radio is configured to provide communications capability in the Very High Frequency (VHF) band and the Ultra High Frequency (UHF) band, and wherein the method further comprises:
receiving a signal in the VHF/UHF band via the manpack; and
routing the received signal directly to the radio.

19. The method of claim 17, further comprising:
receiving a signal in the HF band via the manpack;
converting the received signal; and
routing the converted signal to the radio.

20. The method of claim 19, further comprising:
mixing down the received signal to an intermediate frequency of 86.85 MHz prior to routing the signal to the radio.

21. The communication device of claim 12, wherein the manpack further comprises a plurality of antenna connectors located on a front side of the manpack, and wherein the battery door is located on the front side of the manpack.

22. The communication device of claim 21, wherein the manpack further comprises a cavity configured to house the radio, the cavity having an opening located on the front side of the manpack.

23. The communication device of claim 22, wherein the control unit comprises a user interface for operating the communication device, the user interface being accessible from the front side of the manpack.

24. An apparatus, comprising:
means for receiving a signal via a manpack configured to provide communications capability; and
means for routing the signal from the manpack to a radio removably attached to the manpack, the radio serving as a communications element of the manpack.

25. The apparatus of claim 24, wherein the manpack is configured to provide communications capability in the High Frequency (HF) band.

* * * * *